US008390638B2

(12) United States Patent
Chiou et al.

(10) Patent No.: US 8,390,638 B2
(45) Date of Patent: Mar. 5, 2013

(54) IMAGE COMPENSATION METHODS, SYSTEMS, AND APPARATUSES FOR ORGANIC LIGHT EMITTING DIODE DISPLAY PANEL

(75) Inventors: Yu-Wen Chiou, Tainan (TW); Ming Chun Tseng, Tainan (TW); Hong-Ru Guo, Tainan (TW); Chun-Yu Chen, Tainan (TW)

(73) Assignee: Innolux Corporation (TW)

( * ) Notice: Subject to any disclaimer, the term of this patent is extended or adjusted under 35 U.S.C. 154(b) by 649 days.

(21) Appl. No.: 12/616,284

(22) Filed: Nov. 11, 2009

(65) Prior Publication Data

US 2010/0141667 A1 Jun. 10, 2010

(30) Foreign Application Priority Data

Nov. 13, 2008 (TW) ................................ 97143962 A

(51) Int. Cl.

| | |
|---|---|
| ***G09G 3/30*** | (2006.01) |
| ***G09G 3/36*** | (2006.01) |
| ***G09G 5/00*** | (2006.01) |
| ***G09G 5/10*** | (2006.01) |
| ***H04N 5/202*** | (2006.01) |
| ***H04N 5/14*** | (2006.01) |
| ***H04N 1/40*** | (2006.01) |
| ***H04N 1/46*** | (2006.01) |
| ***G06K 15/00*** | (2006.01) |
| ***G06K 9/00*** | (2006.01) |
| ***G06K 9/40*** | (2006.01) |

(52) U.S. Cl. ............ 345/581; 345/77; 345/89; 345/596; 345/606; 345/690; 348/254; 348/671; 358/3.01; 358/3.06; 358/525; 358/534; 382/169; 382/254; 382/274

(58) Field of Classification Search .................. 345/428, 345/581, 586, 589, 596, 600–602, 606, 643, 345/536–538, 204, 690, 84, 87–89, 63, 77, 345/254, 671, 546–548, 616–618, 639; 348/254, 348/671; 358/1.9, 3.01, 3.03–3.06, 523–525, 358/534, 448; 382/169, 254, 274, 305
See application file for complete search history.

(56) References Cited

U.S. PATENT DOCUMENTS

| | | | | |
|---|---|---|---|---|
| 5,832,123 | A * | 11/1998 | Oyamada | 382/237 |
| 2004/0017343 | A1 * | 1/2004 | Adachi et al. | 345/87 |
| 2007/0081192 | A1 * | 4/2007 | Tai et al. | 358/3.06 |
| 2007/0132674 | A1 * | 6/2007 | Tsuge | 345/77 |
| 2007/0236517 | A1 * | 10/2007 | Kimpe | 345/690 |
| 2008/0199074 | A1 * | 8/2008 | Mitsunaga | 382/169 |
| 2008/0238936 | A1 * | 10/2008 | Kim | 345/618 |
| 2009/0140665 | A1 * | 6/2009 | Park | 315/291 |

* cited by examiner

*Primary Examiner* — Wesner Sajous
(74) *Attorney, Agent, or Firm* — Trop, Pruner & Hu, P.C.

(57) ABSTRACT

One embodiment of the invention includes an image compensation module, an OLED display panel, and an OLED display apparatus. A target current value corresponding to a target gray level is stored in a compensation memory portion. A reference gray level and a reference current value corresponding to the reference gray level are stored in a reference memory portion. A compensation gray level can be obtained by an arithmetic compensation unit according to the target current value, reference gray level, reference current value, and gamma parameter. This may reduce the memory space needed for the compensation and reference memory portions, and compensate the images of the display apparatus and panel so that precise colors can be displayed with a high image quality.

18 Claims, 3 Drawing Sheets

IMAGE COMPENSATION METHODS, SYSTEMS, AND APPARATUSES FOR ORGANIC LIGHT EMITTING DIODE DISPLAY PANEL

CROSS-REFERENCE TO RELATED APPLICATION

Pursuant to 35 U.S.C. §119, this application claims priority to Taiwan Application Serial No. 97143962, filed Nov. 13, 2008, the subject matter of which is incorporated herein by reference.

BACKGROUND

Organic light emitting diodes (OLEDs) have advantages such as self-light emission, high brightness and contrast, light weight, low power consumption, and rapid reaction time. OLED-related components in image display systems may be driven using passive or active matrix techniques. Active matrix OLED displays may include, for example, amorphous silicon (a-Si) thin film transistors (TFTs) or low temperature poly silicon (LTPS) TFTs.

a-Si TFTs have advantages but may also have inconsistent performance properties such as floating state issues that adversely affect threshold voltage and element mobility over time. These issues may result in mura phenomena problems including non-uniform display appearances such as dark spots or poorly contrasted areas. LTPS TFTs also have advantages such as a small size that allows for an increased pixel aperture ratio. They can also be manufactured on a glass substrate at the same time as a pixel driving circuit located on a display panel periphery, thereby reducing the number of wires needed in the display. This manufacturing technique may enhance reliability and decrease manufacturing costs for OLED display panels. However, LPTS TFTs also have inconsistent performance properties that can result in mura phenomena difficulties.

To address mura phenomena issues, one may store threshold voltage and pixel mobility values collected when displaying each gray level in each pixel during, for example, the manufacturing process. The threshold voltage and mobility values are then input with pixel data for each pixel to provide voltage compensation that counters mura phenomenon issues and allows each pixel to display precise desired colors. However, storing such large amounts of data requires large memory capacity.

BRIEF DESCRIPTION OF THE DRAWINGS

The accompanying drawings are included to provide a further understanding of various embodiments of the invention and are incorporated in and constitute a part of this specification. The drawings illustrate embodiments of the invention and, together with the description, serve to explain the principles of the invention.

DETAILED DESCRIPTION

The following description refers to the accompanying drawings. Among the various drawings the same reference numbers may be used to identify the same or similar elements. While the following description provides a thorough understanding of various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions, well known devices, circuits, and techniques have been omitted to avoid clouding the description of various embodiments of the invention with unnecessary detail. References to "one embodiment", "an embodiment", "example embodiment", "various embodiments", etc. indicate that the embodiment(s) of the invention so described may include particular features, structures, or characteristics, but not every embodiment necessarily includes the particular features, structures, or characteristics. Further, some embodiments may have some, all, or none of the features described for other embodiments. Also, unless otherwise specified the use of "first", "second", "third", etc., to describe a common object merely indicate that different instances of like objects are being referred to and are not intended to imply that the objects so described must be in a given sequence, either temporally, spatially, in ranking, or in any other manner.

One embodiment of the invention includes an image compensation module, an OLED display panel, and an OLED display apparatus or device. A target current value corresponding to a target gray level is stored in a compensation memory portion. A reference gray level and a reference current value corresponding to the reference gray level are stored in a reference memory portion. A compensation gray level can be obtained by an arithmetic compensation unit according to the target current value, reference gray level, reference current value, and gamma parameter. This may reduce the memory space needed for the compensation and reference memory portions, and compensate the images of the display apparatus and panel so that precise colors can be displayed with a high image quality.

Figure 1:
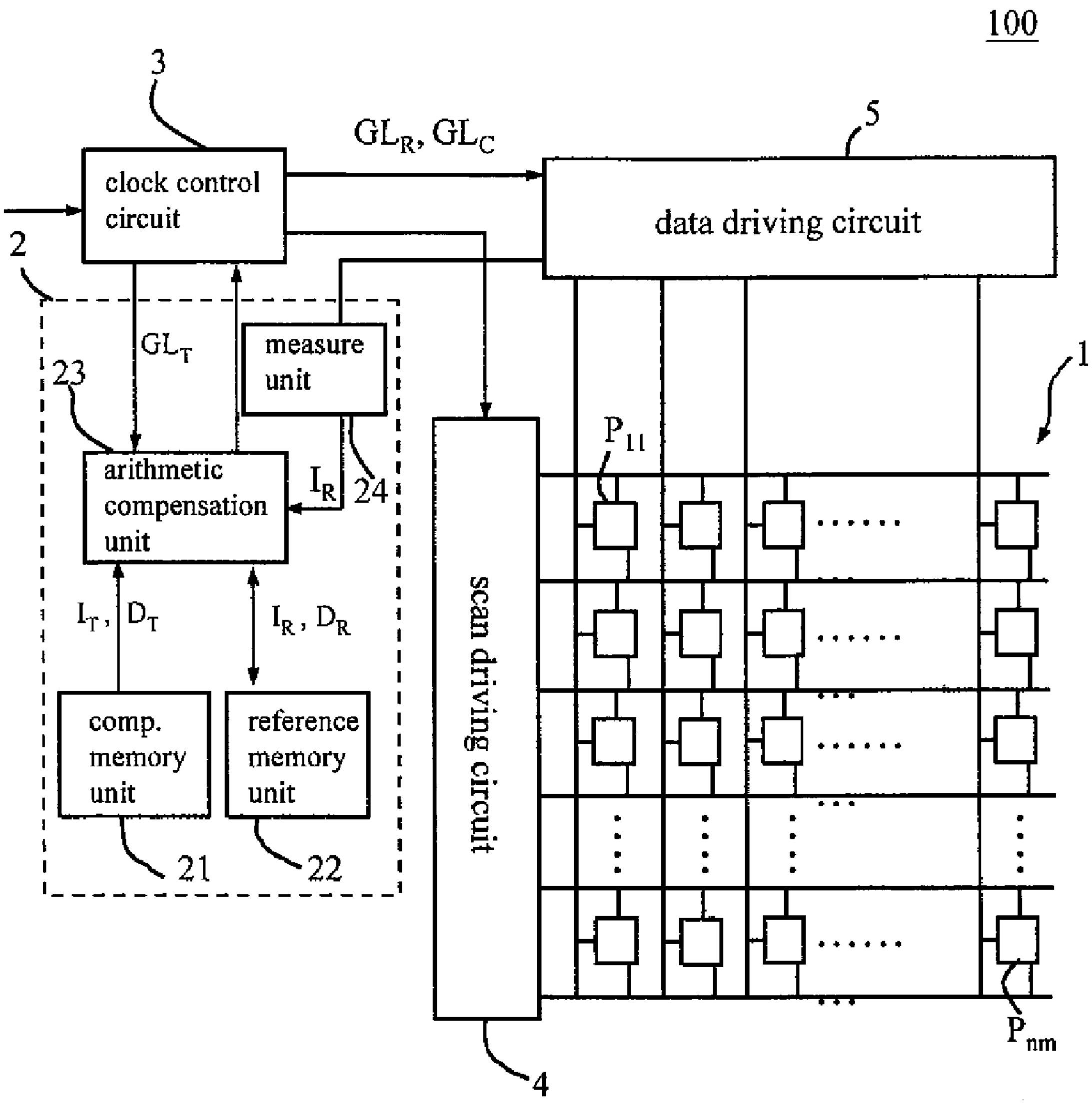
FIG. 1 is a schematic diagram of a display device according to an embodiment of the invention.

FIG. 1 depicts one embodiment of display device 100, which includes OLED display panel 1 having pixels $P_{11}$ to $P_{nm}$ each including a LIPS TFT. Device 100 may couple (e.g., directly or indirectly electrically connect) together panel 1, image compensation module 2, clock control circuit 3, scan driving circuit 4, and data driving circuit 5. Image compensation module 2 may include or couple to compensation memory portion 21, reference memory portion 22, arithmetic compensation unit 23, and measuring unit 24. In one embodiment compensation memory portion 21 and reference memory portion 22 are in separate memory devices but in other embodiments they are included in the same memory device (e.g., single flash memory device).

Figure 2A:
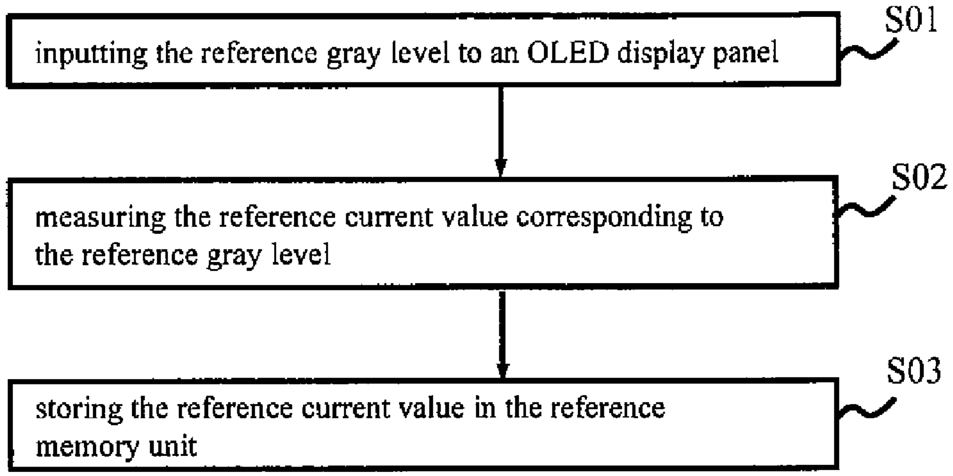
FIGS. 2*a-b* are flow diagrams for techniques of operating a display device in an embodiment of the invention.
Figure 2B:
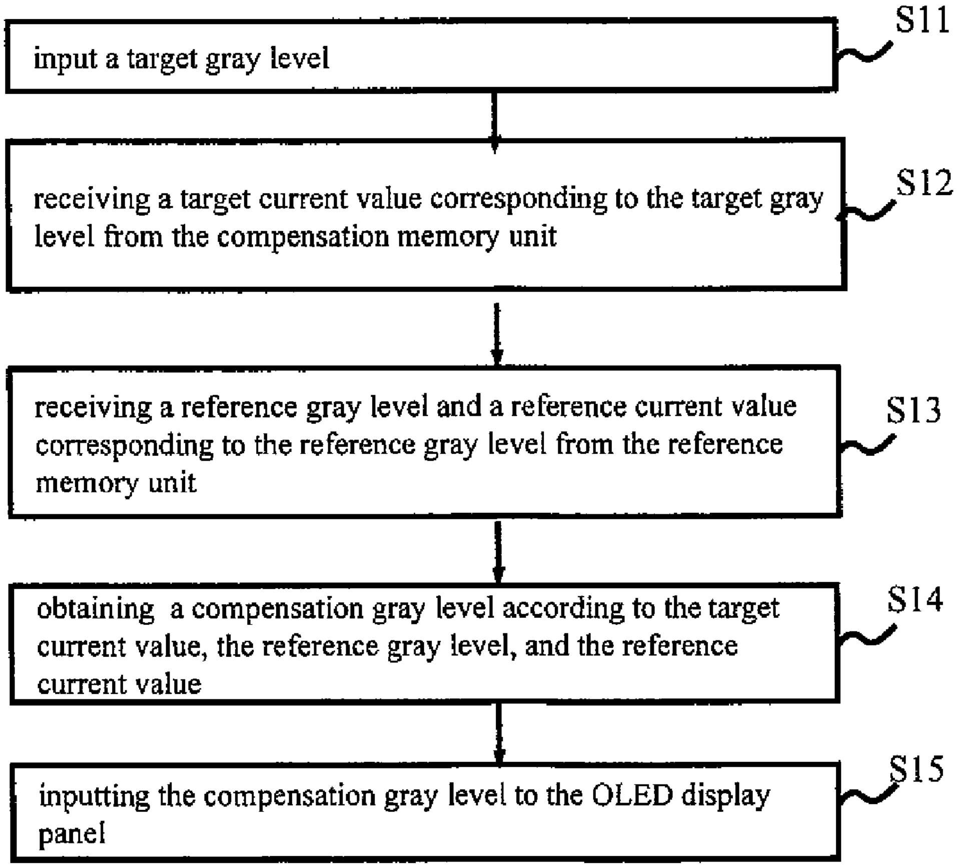

For purposes of clarity, the following embodiment of a technique is described in relation to its application to a single pixel (e.g., $P_{11}$), but it should be understood the technique is applicable to multiple pixels. FIGS. 2A and 2B respectively concern measure and display phases of an image compensation technique in one embodiment of the invention. The measure phase in FIG. 2A may be performed, for example, while manufacturing panel 1, when panel 1 is turned on at some time after manufacturing is complete, or at a time determined by a user. The measuring phase allows device 100 to store information needed for image compensation. In block S01 reference gray level $GL_R$ is input to panel 1. For example, clock control circuit 3 may input reference gray level $GL_R$ to data driving circuit 5 and a corresponding voltage or current may be output from circuit 5 to drive pixel $P_{11}$. The value of reference gray level $GL_R$ is not necessarily limited (e.g., reference gray level $GL_R$ may range from 0 to 255 in an 8-bit embodiment).

In block S02 reference current value $I_R$, corresponding to reference gray level $GL_R$ in pixel $P_{11}$, is measured using measuring unit 24 in an embodiment. Measuring unit 24 may be included in image compensation module 2, data driving circuit 5, or elsewhere. Again, focus is placed on $P_{11}$ for clarity. However, other reference current values can be determined for other reference gray levels within pixel $P_{11}$ and reference current values can also be determined for other pixels in display 1.

In block S03 reference current value $I_R$ is stored in reference memory portion 22. In an embodiment, reference current value $I_R$ is input to arithmetic compensation unit 23 and then stored in reference memory portion 22. $I_R$, which may be in analog form, may be converted to digital form for storage in reference memory portion 22 using an analog-to-digital converter (ADC) included in arithmetic compensation unit 23, measuring unit 24, or elsewhere.

FIG. 2B concerns the display phase. In block S11 clock control circuit 3 may input target gray level $GL_T$, as it relates to pixel $P_{11}$, to arithmetic compensation unit 23. Target gray level $GL_T$ is the gray level value device 100 would expect for $P_{11}$ absent any offsetting effects due to irregularities of OLED $P_{11}$. $GL_T$ may be unlimited (e.g., $GL_T$ may range from 0 to 255 in an 8-bit embodiment).

In block S12 target current value $I_T$, corresponding to target gray level $GL_T$, may be received from compensation memory portion 21. An embodiment of a gamma equation is shown below:

$$I_T = I_{255} * (GL_T / 255)^{\Gamma} \quad (1)$$

In an embodiment, gamma parameter Γ may be 2.0, 2.1, or 2.2. Gamma parameter Γ may be, for example, 2.2. Current $I_{255}$ is the corresponding current value when target gray level $GL_T$ is equal to gray level 255. Current $I_{255}$ may be calculated by arithmetic compensation unit 23 according to equation (1).

Figure 3:
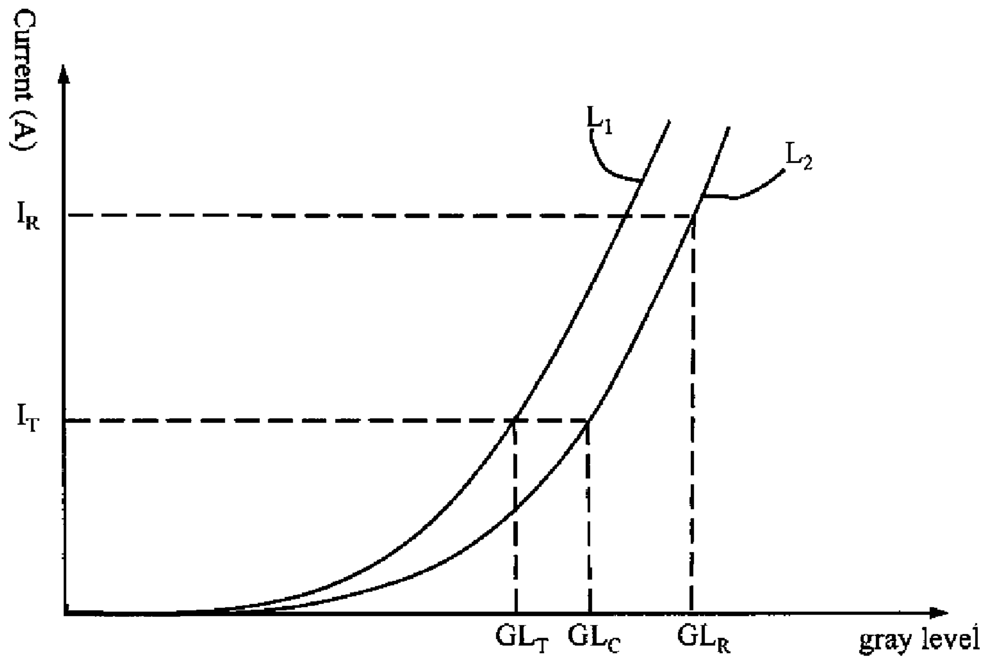
FIG. 3 is a graph used to provide voltage compensation in one embodiment of the present invention.

FIG. 3 uses curve $L_1$ to plot the results of equation 1. Curve $L_1$ is a characteristic curve for pixel $P_{11}$ reflecting brightness, material, and aperture ratio properties of the pixel and its components (e.g., a LTPS TFT). Curve $L_1$ may be determined during panel manufacturing, when device 100 is turned on, or at other times. Gamma equation (1) shows the relationship for pixel $P_{11}$ between target gray level $GL_T$ and target current value $I_T$. After current $I_{255}$ is calculated, different current values $I_T$ corresponding to different gray levels $GL_T$ may be calculated according to equation (1) to obtain curve $L_1$. Therefore, compensation memory portion 21 may only need to store target current value $I_T$, corresponding to gray level $GL_T$, thereby lowering memory requirements and increasing read speed for compensation memory portion 21. Target gray level $GL_T$, target current value $I_T$, and curve $L_1$ form standards based on brightness, material property, and aperture ratio of $P_{11}$. These standards will serve as bases to compensate OLED pixel $P_{11}$, as described further below.

In block S13, for pixel $P_{11}$ reference gray level $GL_R$ is received and the corresponding reference current value $I_R$ is received from reference memory portion 22. A gamma equation is shown below:

$$I_R = I'_{255} * (GL_R / 255)^{\Gamma} \quad (2)$$

Gamma parameter Γ is 2.2 in an embodiment. After the current value measured by the gray level 255, or by another gray level, is input to panel 1, current $I'_{255}$ can be calculated by arithmetic compensation unit 23 according to the current value, inputted gray level value, and equation (2).

FIG. 3 uses curve $L_2$ to plot the results of equation 2. Curve $L_2$ is a characteristic curve where gray levels correspond to current values under the condition of gamma parameterΓ. Thus, gamma equation (2) shows the relationship for pixel $P_{11}$ between $GL_R$ and $I_R$. After current $I'_{255}$ is calculated, different $I_R$ current values corresponding to different reference gray levels $GL_R$ can be calculated according to equation (2) to obtain curve $L_2$. Therefore, reference memory portion 22 may only store reference current value $I_R$, corresponding to reference gray level $GL_R$. This may lower memory requirements and increase read speed for compensation memory portion 21.

In block S14 compensation gray level $GL_C$ is determined based on target current value $I_T$, reference gray level $GL_R$, and reference current value $I_R$. FIG. 3 indicates that, because LTPS TFTs have non-uniform characteristics, curve $L_2$ may be offset from the standard data of curve $L_1$ for pixel $P_{11}$. However, target current value $I_T$ of curve $L_1$ may be mapped to curve $L_2$ to obtain compensation gray level $GL_C$ for pixel $P_{11}$. The following equation can be acquired by dividing the equation (1) by the equation (2):

$$GL_C = GL_R \times (I_T / I_R)^{1/2.2} \quad (3)$$

Compensation gray level $GL_C$ may be calculated by arithmetic compensation unit 23.

In block S15 compensation gray level $GL_C$ is input. In an embodiment, compensation gray level $GL_C$ is input to data driving circuit 5 by arithmetic compensation unit 23, and then a compensated corresponding voltage or current is output by data driving circuit 5 to drive pixel $P_{11}$ and compensate the images of the display device and panel so that precise colors can be displayed with a high image quality.

Since each of pixels $P_{11}$ to $P_{nm}$ may differ from each other due to various irregularities (e.g., irregularities associated with LTPS TFTs), image compensation module 2 may need to individually compensate pixels $P_{11}$ to $P_{nm}$. Thus, while the above examples addressed only $P_{11}$ for purposes of clarity, other pixels are now addressed.

Compensation memory portion 21 may store target current data $D_T$, which may include a plurality of target current values corresponding to a plurality of target gray levels in a single pixel. For example, the plurality of current values $I_{T0}$ to $I_{T255}$ may correspond to gray levels 0 to 255 for pixel $P_{11}$. Similar data may be stored for other pixels. Thus, the arithmetic compensation unit 23 workload may be reduced because $I_T$ values, calculated according to equation (1), may already be stored for each individual pixel. In some embodiments $D_T$ may include target current values from different pixels that all relate to a single target gray level. In other words, $D_T$ may include target current data as it relates to one or many pixels and/or one or many target gray levels.

Also, reference memory portion 22 may store reference current data $D_R$ that may include a plurality of reference current values $I_{R11}$ to $I_{Rnm}$ corresponding to m*n target gray levels $GL_T$. Thus, the arithmetic compensation unit 23 workload may be reduced because $I_R$ values, calculated according to equation (2), may already be stored for each pixel. Of course, in some embodiments $D_R$ may include reference current values from different pixels that all relate to a single reference gray level. In other words, $D_R$ may include reference current data as it relates to one or many pixels and/or one or many reference gray levels.

Arithmetic compensation unit 23 may couple to compensation memory portion 21 and reference memory portion 22 and may obtain compensation gray level $GL_C$ according to equation (3) using target current data $D_T$, reference gray level $GL_R$, and reference current data $D_R$. This may reduce the memory space needed for the compensation and reference memory portions, and compensate the images of the display device and panel so that precise colors can be displayed with a high image quality.

In an embodiment, to have different display effects panel 1 can be divided into a plurality of display zones (not shown), each being compensated in accordance with embodiments of compensation techniques and different conditions of gamma parameters described herein. For example, pixels in different zones may have different parameters meaning the different zones have different characteristics. Thus, for each specific target gray level the target current value might differ for pixels in different display zones and thus, each zone may need to be compensated differently. Hence, in an embodiment target current data $D_T$ may include a plurality of target current values corresponding to target gray levels for different pixels or different display zones.

Embodiments may be implemented in code and may be stored on a storage medium having stored thereon instructions, which can be used to program a system to perform the instructions, data, information, values, etc. The storage medium (e.g., units 21, 22) may include or couple to, without limitation, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Device 100 may include, for example, a processor, a memory unit, a storage unit, a clock, and other suitable hardware components and/or software components. In some embodiments, some or all of the components of device 100 may be enclosed in a common housing or packaging, and may be interconnected or operably associated. In other embodiments, components of device 100 may be distributed among multiple or separate sub-units, devices or locations.

Units and components (e.g. units and circuits 3, 4, 5, 23, 24) of device 100 may include, be included in, or couple to a processor, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), a CMOS chip, or any other suitable multi-purpose or specific processor, controller, or circuit.

Thus, device 100 may include units, such as compensation unit 23, which include and/or use hardware, software, and combinations thereof to accomplish their described functions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An image compensation method comprising:

obtaining a target gray level and a reference gray level;

obtaining a target current value, corresponding to the target gray level, from a compensation memory portion;

obtaining a reference current value, corresponding to the reference gray level, from a reference memory portion;

obtaining a compensation gray level based on the target current value, the reference gray level, and the reference current value;

driving a display panel based on the compensation gray level; and storing the target current value and additional target current values corresponding to additional target gray levels in the compensation memory portion, wherein the target current value and additional target current values correspond to a single pixel included in the display panel.

2. The method of claim 1 including obtaining the compensation gray level based on $$GL_C = GL_R \times (I_T / I_R)^{1/\Gamma 1},$$

wherein $GL_C$ is the compensation gray level, $GL_R$ is the reference gray level, $I_T$ is the target current value, $I_R$ is the reference current value, and $\Gamma_1$ is a gamma parameter.

3. The method of claim 1 including:

inputting the reference gray level to the display panel, the panel including organic light emitting diodes (OLEDs);

measuring the reference current value corresponding to the inputted reference gray level; and storing the reference current value in the reference memory portion.

4. The method of claim 1 including storing the reference current value and additional reference current values corresponding to additional reference gray levels in the reference memory portion, wherein the reference current value and additional reference current values correspond to the single pixel.

5. The method of claim 1 including:

comparing the target gray level with a previously stored target gray level, wherein the target current value corresponds to the previously stored target gray level; and driving the display panel further based on the comparison between the target gray level with the previously stored target gray level.

6. The method of claim 1 including obtaining the compensation gray level without storing threshold voltage data or mobility value data for the display panel.

7. An image compensation module, comprising:

a first memory portion to store a target current value corresponding to a target gray level and electrically couple to a compensation unit; and a second memory portion to store a reference current value corresponding to a reference gray level and electrically couple to the compensation unit;

wherein the compensation unit is to obtain a compensation gray level, based on the target current value, the reference gray level, and the reference current value, the compensation gray level is to drive an organic light emitting diode (OLED) display panel, and the first memory portion is to store the target current value and additional target current values corresponding to additional target gray levels, the target current value and additional target current values to correspond to a single pixel included in the display panel.

8. The module of claim 7, wherein the compensation gray level is to be obtained based on $$GL_C = GL_R \times (I_T / I_R)^{1/\Gamma 1},$$

$GL_C$ is the compensation gray level, $GL_R$ is the reference gray level, $I_T$ is the target current value, $I_R$ is the reference current value, and $\Gamma_1$ is a gamma parameter.

9. The module of claim 7 including a measuring unit to measure the reference current value before the reference current value is stored in the second memory portion.

10. The module of claim 7, wherein the module is configured to determine the target current value before storing the target current value in the first memory portion.

11. The module of claim 7, wherein:

the second memory portion is to store the reference current value and additional reference current values corresponding to additional reference gray levels, the reference current value and additional reference current values to correspond to the single pixel.

12. An organic light emitting diode (OLED) display apparatus comprising:

a plurality of OLED pixels; and an image compensation module including:

a first memory portion to store a target current value corresponding to a target gray level and electrically couple to a compensation unit; and a second memory portion to store a reference current value corresponding to a reference gray level and electrically couple to the compensation unit;

wherein the compensation unit is to obtain a compensation gray level, based on the target current value, the reference gray level, and the reference current value, and the compensation gray level is to drive a pixel included in the plurality of OLED pixels, and the first memory portion is to store the target current value and additional target current values corresponding to additional target gray levels, the target current value and additional target current values to correspond to the pixel.

13. The apparatus of claim 12, wherein the compensation gray level is to be obtained based on $$GL_C = GL_R \times (I_T / I_R)^{1/\Gamma 1},$$

$GL_C$ is the compensation gray level, $GL_R$ is the reference gray level, $I_T$ is the target current value, $I_R$ is the reference current value, and $\Gamma_1$ is a gamma parameter.

14. The apparatus of claim 12, wherein the module includes a measuring unit to measure the reference current value before the reference current value is stored in the second memory portion.

15. The apparatus of claim 12, wherein the module is to determine the target current value before storing the target current value in the first memory portion.

16. The apparatus of claim 12, wherein the second memory portion is to store the reference current value and additional reference current values corresponding to additional reference gray levels, the reference current value and additional reference current values to correspond to the pixel.

17. The apparatus of claim 12, wherein the compensation unit is to obtain the target current value by solving a gamma equation.

18. The apparatus of claim 12, wherein the compensation unit is to obtain the compensation gray level without the apparatus storing threshold voltage data or mobility value data for the pixel.

* * * * *

UNITED STATES PATENT AND TRADEMARK OFFICE

CERTIFICATE OF CORRECTION

PATENT NO. : 8,390,638 B2
APPLICATION NO. : 12/616284
DATED : March 5, 2013
INVENTOR(S) : Yu-Wen Chiou et al.

It is certified that error appears in the above-identified patent and that said Letters Patent is hereby corrected as shown below:

Title Page, Item (73) Assignee should be --Chi Mei El Corporation and Chimei Innolux Corporation--

Signed and Sealed this
Fifteenth Day of October, 2013

Teresa Stanek Rea
*Deputy Director of the United States Patent and Trademark Office*